United States Patent [19]
Stenzel et al.

[11] 4,128,620
[45] Dec. 5, 1978

[54] PRODUCTION OF PHOSPHINE

[75] Inventors: Jürgen Stenzel; Gero Heymer, both of Erftstadt-Liblar, Fed. Rep. of Germany

[73] Assignee: Hoechst Aktiengesellschaft, Frankfurt am Main, Fed. Rep. of Germany

[21] Appl. No.: 830,160

[22] Filed: Sep. 2, 1977

[30] Foreign Application Priority Data

Sep. 4, 1976 [DE] Fed. Rep. of Germany ....... 2639941

[51] Int. Cl.² ............................................. C01B 25/00
[52] U.S. Cl. ...................................... 423/299; 423/305
[58] Field of Search ........................ 423/299, 305, 307

[56] References Cited
U.S. PATENT DOCUMENTS 3,008,805 11/1961 Addamiano ........................... 423/299
3,375,074 3/1968 Palmer ................................. 423/299

FOREIGN PATENT DOCUMENTS 43-26387 11/1968 Japan ....................................... 423/299

*Primary Examiner*—G. O. Peters
*Assistant Examiner*—Gregory A. Heller
*Attorney, Agent, or Firm*—Connolly and Hutz

[57] ABSTRACT

Production of phosphine. The phosphine is produced by reducing, in a first step, anhydrous zinc phosphate to zinc phosphide by treatment with carbon at a temperature higher than 1000° C, and, in a second step, reacting the zinc phosphide formed in the first step with phosphoric acid. The resulting gaseous phosphine is collected, and the resulting zinc phosphate, which is obtained as a difficultly soluble precipitate, is dried, dehydrated and recycled to the first step.

9 Claims, No Drawings

PRODUCTION OF PHOSPHINE

This invention relates to a process for making phosphine (hydrogen phosphide). Phosphine is a compound which contains phosphorus in its lowest valence stage and which exhibits metastability at room temperature. Phosphorus of a higher oxidation stage which is subjected to reduction gives elementary phosphorus rather than phosphine. To reduce elementary phosphorus to phosphine, one must effect the reduction with activated hydrogen, e.g. that which is generated electrolytically (cf. German Patent Specification No. 1112722).

A disadvantage of this procedure is that the electrode-surrounding regions must be separated from each other by means of (e.g.) a ceramic diaphragm, which raises a problem in respect of the particular material to be used, and whereby the electrolytic efficiency is impaired. In addition to this, the phosphine is formed together with hydrogen, and is in fact seriously contaminated therewith.

Phosphine can also be made by subjecting elementary phosphorus to disproportionation in an acid medium: cf. U.K. Patent Specification No. 990918; German Patent Specification No. 1219911; and U.S. Patent Specification No. 3,371,994. As described therein, red phosphorus is reacted in an acid medium with the resultant concurrent formation of phosphoric acid and phosphine.

One disadvantage of this prior process is that the reaction takes place at elevated temperatures (280°–300° C.) at which substantially all reactor materials undergo serious corrosion in contact with concentrated phosphoric acid. Also, the space/time-yields are poor, as the overall reaction involves two individual reactions, which occur reluctantly, namely:

(a) the conversion of yellow to red phosphorus, and
(b) the reaction of red phosphorus with steam to give phosphine and phosphoric acid.

A further known process for making phosphine comprises reacting yellow phosphorus with an alkaline medium (U.S. Patent Specification No. 2,977,192); however, this is not satisfactory as only about 25% of the phosphorus used undergoes conversion to the desired phosphine, which is obtained together with an about 10 times larger quantity of by-products (notably sodium hypophosphite and sodium phosphite). Also, the resulting phosphine is contaminated with hydrogen, which is formed at the same time.

It is therefore an object of the present invention to provide a process which permits substantially pure phosphine to be produced in a simple manner and in high yields from readily accessible salts of orthophosphoric acid.

According to the present invention, we provide a process for making phosphine, which comprises reducing, in a first step, anhydrous zinc phosphate to zinc phosphide by treatment with carbon at a temperature higher than 1000° C., and, in a second step, reacting the zinc phosphide formed in the first step with phosphoric acid, the resulting gaseous phosphine being collected, and the resulting zinc phosphate being dried, dehydrated and recycled to the first step. The zinc phosphate obtained in the second step is a difficultly soluble precipitate.

The zinc phosphide formed in the first step is preferably reacted with the phosphoric acid in the second step at a temperature of 20° to 200° C. It is also preferable that this phosphoric acid should have a strength of 20 to 85 weight % of $H_3PO_4$. A further preferred feature is that the zinc phosphate obtained in the second step should be dehydrated by heating it to 220° to 280° C., preferably approximately 250° C. In the first step, the anhydrous zinc phosphate is preferably reduced at a temperature of 1000° to 1300° C., advantageously with the use of carbon derived from petroleum (referred to below as petroleum coke).

It is also good practice, prior to the reduction, to prepare an intimate mixture of the anhydrous zinc phosphate and carbon, and preferably to make this mixture into pellets. The zinc phosphide is evolved in vapour form during the reduction of the anhydrous zinc phosphate, and is preferably passed from the reactor employed for the reduction to a container in which it is allowed to cool and to condense in the form of a fine particulate sublimate.

Certain phosphides (AlP, $CA_3P_2$, $Mg_3P_2$) are known to undergo reaction and hydrolysis with water to give phosphine. It is also known that $Zn_3P_2$ does not decompose in water, but only in an acid medium. It would be normal to propose to effect this decomposition of zinc phosphide with the use of hydrochloric or sulfuric acid, to give a water-soluble zinc salt. In marked contrast with this, water-insoluble zinc phosphate is obtained if, as in the present process, use is made of phosphoric acid. To react the zinc phosphide with the phosphoric acid as completely as possible, we use finely divided zinc phosphide, obtained preferably by preparing an intimate mixture of anhydrous zinc phosphate and carbon and heating the mixture to above 1000° C.

Zinc phosphide has the unusual property of being sublimable, and use can be made of this for converting it into a sublimate comprising very fine particulate material such as is to be desired for the reaction with the phosphoric acid. To this end, it is appropriate, during the cooling of the zinc phosphide vapour, to avoid allowing it to come into contact with a surface which is unduly cold, as the latter would then become encrusted with hard compact material which would be difficult to remove mechanically.

To avoid this, it is good practice to introduce the hot reaction gas evolved in the first step of the present process into a heated container, but this should desirably be of sufficiently large dimensions to ensure contact of the hot reaction gas with its wall at temperatures lower than 600° C.; more than 95% of the $Zn_3P_2$ in the gas can then be precipitated, in the form of a loose black powder.

The process of the present invention offers the following advantages:

(1) It is an ecologically acceptable process. The decomposition of certain phosphides (AlP, $CA_3P_2$) is normally accompanied by the formation of oxides, hydroxides and salts which have unpleasant smell, and which are difficult to dispose of. In marked contrast with this, the salt (zinc phosphate) obtained in the present process is recycled.

(2) Phosphine can be produced substantially without by-products. More particularly, phosphine is the only product which need be taken from the production equipment, since carbon monoxide formed in the first step can be used for heating the reduction reactor.

(3) The phosphine obtained as the final product is of high purity, usually more than 95% of $PH_3$, the balance being $H_2$.

(4) The zinc phosphide formed in the first step, which is both toxic and pyrophoric, need not be ground.

(5) In marked contrast with the prior methods commonly used for making PH$_3$, use is made in the present process of harmless starting materials, more particularly phosphoric acid, carbon and zinc phosphate.

The following Examples illustrate the invention. It is to be understood that the zinc phosphate obtained in the second step was in all cases dried, dehydrated and recycled to the first step when the procedures of the Examples were carried out on a commercial scale.

EXAMPLE 1

97 g of Zn$_3$(PO$_4$)$_2$ and 24.3 g of pulverulent coal (98% carbon; under 0.1 mm.) were dry-blended and rammed into a graphite crucible which was heated in a larger crucible in an electric furnace under nitrogen. Gas began to be evolved reluctantly at 900° C., and was evolved markedly at 1000° C. and vigorously at 1200° C. Altogether 42.7 normal liters of CO were collected. The loss in weight was 55.0 g.

66.3 g of reaction product was found to have sublimed in the crucible near its upper cooler peripheral portion. 2.4 g of pulverulent coal was left in the base portion of the crucible. X-ray investigation showed the reaction product to be Zn$_3$P$_2$. It was pulverized. The sieve fraction comprising particles with a size of less than 0.06 mm weighed 56.8 g. It was admixed dropwise with 60 g of phosphoric acid with a strength of 50%. The whole was then heated to 70° C. and 9.1 normal liters of gas composed of 3.4 volume % of H$_2$ and 96.5 volume % of PH$_3$ were obtained. The dark grey residue weighed 92 g. X-ray investigation showed this residue to be Zn$_3$(PO$_4$)$_2$ . 2 H$_2$O.

EXAMPLE 2

A graphite crucible with an internal diameter of 40 mm and a length of 170 mm was used. The crucible was surrounded by a graphite coil and heated in such a manner that it was impossible for zinc phosphide to condense in the crucible and in the immediate neighbourhood of the crucible opening. The water-cooled cylindrical wall of the furnace was disposed so as to be everywhere spaced away more than 130 mm from the crucible. Pellets made from a mixture of zinc phosphate and coal were allowed to fall from a nitrogen-scavenged reservoir into the hot graphite crucible, in which the zinc phosphate was reduced. 103.7 g of pellets made from a mixture of 83.0 g of anhydrous Zn$_3$(PO$_4$)$_2$ and 20.7 g of coal were admitted portionwise within 3 hours to the hot crucible at 1210° C.

38 normal liter of gas was evolved (this was registered by means of a gas meter). Next, heating was discontinued. Altogether 4.0 g of salt beads were found in the crucible. 50.6 g of sublimation product which accumulated at the bottom and adhered as fluff to the wall of the crucible was collected.

The product had a purity of 98 weight % and a particle size of less than 4μ.

X-ray investigation exclusively showed the spectral lines of Zn$_3$P$_2$. The decomposition of 42.3 g of sublimation product with 52 ml of 50% phosphoric acid gave 7 normal liters of gas which contained 97 volume % of PH$_3$. 71.5 g of washed and dried residue was obtained. It was subjected to X-ray investigation and found to consist of Zn$_3$(PO$_4$)$_2$ . 2 H$_2$O and Zn$_3$(PO$_4$)$_2$ . 4 H$_2$O.

EXAMPLE 3

A graphite crucible with an internal diameter of 42 mm and a length of 250 mm was placed in a quartz tube 50 mm wide and 500 mm long, which was closed at one end and which was provided with a lateral gas outlet (internal diameter = 10 mm). The graphite crucible was filled with 100 g of petroleum coke (95% C; particle size = less than 1 mm) up to a height of approximately 150 mm. The quartz tube was heated to 1250° C. over a length of 350 mm extending from the quartz tube to the gas outlet. The quartz tube was additionally provided at its upper end with a nitrogen-scavenged metering device for the supply of a mixture of zinc phosphate and pulverulent carbon.

The reaction products comprising gaseous zinc phosphide and carbon monoxide were conveyed from the reaction chamber to a quartz tube which had been fused thereto and in which very finely divided zinc phosphide deposited as a precipitate, while the CO was allowed to escape and burnt.

The 100 g of petroleum coke placed in the graphite crucible was heated to 1180° C. Next, a pulverulent mixture of 100 g of Zn$_3$(PO$_4$)$_2$ and 26 g of coke (95% C) was allowed to drop into the crucible, initially at a rate of 50 g and then in 8 to 10 g portions at intervals of 20 minutes. The nitrogen used for scavenging was employed at a constant rate of flow of 5 l/h, and carbon monoxide was evolved at an average rate of 12 l/h (which varied periodically with the supply of material).

Altogether 173 g of a mixture of 137 g of Zn$_3$(PO$_4$)$_2$ and 36 g of petroleum coke was added within 5½ hours. 2 g of unreacted zinc phosphate, which was partially in the form of molten beads, remained in the graphite crucible.

83.5 g of very finely divided zinc phosphide (100% smaller than 40μ) was collected in the container.

40 g of this zinc phosphide was decomposed with 67 g of 50% phosphoric acid, and 6.8 normal liters of gas, of which 98% was PH$_3$, were evolved.

The residue, which was filtered off and dried, was dark (coal particles having been carried over), and weighed 69 g. X-ray investigation showed that it consisted of Zn$_3$(PO$_4$)$_2$ . 2 H$_2$O and Zn$_3$(PO$_4$)$_2$ . 4 H$_2$O.

We claim:

1. A process for making phosphine, which comprises reducing, in a first step, anhydrous zinc phosphate to zinc phosphide by treatment with carbon at a temperature higher than 1000° C., and, in a second step, reacting the zinc phosphide formed in the first step with phosphoric acid, the resulting gaseous phosphine being collected, and the resulting zinc phosphate, which is obtained as a difficultly soluble precipitate, being dried, dehydrated and recycled to the first step.

2. The process as claimed in claim 1, wherein the zinc phosphide formed in the first step is reacted with the phosphoric acid in the second step at a temperature of 20° to 200° C.

3. The process as claimed in claim 1, wherein the zinc phosphide formed in the first step is reacted in the second step with phosphoric acid having a strength of 20 to 85 weight% of H$_3$PO$_4$.

4. The process as claimed in claim 1, wherein the zinc phosphate obtained in the second step is dehydrated by heating it to approximately 250° C.

5. The process as claimed in claim 1, wherein, in the first step, the anhydrous zinc phosphate is reduced at a temperature of 1000° to 1300° C.

6. The process as claimed in claim 1, wherein, in the first step, the zinc phosphate is reduced with the aid of carbon derived from petroleum.

7. The process as claimed in claim 1, wherein the anhydrous zinc phosphate and carbon are intimately mixed together and the resulting mixture is heated to the reduction temperature.

8. The process as claimed in claim 7, wherein the mixture of the anhydrous zinc phosphate and carbon is made into pellets and the pellets are heated to the reduction temperature.

9. The process as claimed in claim 1, wherein the zinc phosphide is evolved in vapour form during the reduction of the anhydrous zinc phosphate, and is passed from the reactor employed for the reduction to a container in which it is allowed to cool and to condense in the form of a fine particulate sublimate.

* * * * *